US011121493B2

(12) United States Patent
Lyon

(10) Patent No.: US 11,121,493 B2
(45) Date of Patent: Sep. 14, 2021

(54) REPLACEABLE PIN FOR TERMINAL OF CHARGING INLET ASSEMBLY

(71) Applicant: TE CONNECTIVITY CORPORATION, Berwyn, PA (US)

(72) Inventor: Zachary Wood Lyon, Lewisville, NC (US)

(73) Assignee: TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 16/511,617

(22) Filed: Jul. 15, 2019

(65) Prior Publication Data
US 2020/0227853 A1 Jul. 16, 2020

Related U.S. Application Data

(60) Provisional application No. 62/791,066, filed on Jan. 11, 2019.

(51) Int. Cl.
*H01R 13/207* (2006.01)
*H01R 13/422* (2006.01)
(Continued)

(52) U.S. Cl.
CPC ........... *H01R 13/207* (2013.01); *H01R 13/17* (2013.01); *H01R 13/4223* (2013.01); *H01R 13/521* (2013.01); *H01R 43/22* (2013.01)

(58) Field of Classification Search
CPC ...... H01R 43/22; H01R 13/42; H01R 13/207; H01R 13/213; H01R 13/17; H01R 13/111;
(Continued)

(56) References Cited

U.S. PATENT DOCUMENTS 2,917,722 A * 12/1959 Cobbett ................. H01R 13/42
                                                        439/586
3,370,264 A *  2/1968 Kelly ................. H05K 13/0447
                                                        439/744
(Continued)

FOREIGN PATENT DOCUMENTS

JP         2015162352 A         9/2015

OTHER PUBLICATIONS

International Search Report, International Application No. PCT/IB2020/050049, International Filing Date, Jan. 6, 2020.

*Primary Examiner* — Abdullah A Riyami
*Assistant Examiner* — Marcus E Harcum

(57) ABSTRACT

A terminal for a charging inlet assembly includes a head, a mating shaft, and a replaceable pin removably coupled to the head. The head is secured in a terminal channel of a housing of the charging inlet assembly having a terminating end configured to be terminated to a power cable. The mating shaft has threads. The replaceable pin has an outer surface defining a separable mating interface for mating engagement with a charging conductor of a charging connector. The replaceable pin has a drive base at the rear including drive teeth configured to be engaged by a socket tool to rotate the replaceable pin relative to the head for installing or removing the replaceable pin. The mating shaft is threadably coupled to at least one of the head or the replaceable pin in a corresponding threaded bore of the head or the replaceable pin.

20 Claims, 8 Drawing Sheets

(51) Int. Cl.
*H01R 43/22* (2006.01)
*H01R 13/52* (2006.01)
*H01R 13/17* (2006.01)

(58) Field of Classification Search
CPC ........ H01R 13/434; H01R 4/308; H01R 4/56; H01R 13/56; H01R 13/521; H01R 13/4223; B60L 53/16
USPC .................................. 439/891, 801, 802
See application file for complete search history.

(56) References Cited

U.S. PATENT DOCUMENTS

| | | | | |
|---|---|---|---|---|
| 3,538,585 A * | 11/1970 | Hendry | ................ | H01R 43/22 29/764 |
| 3,896,535 A * | 7/1975 | Tucci | ................ | H01R 43/22 29/747 |
| 4,028,790 A * | 6/1977 | Dupuis | ................ | H01R 43/22 29/764 |
| 5,791,919 A * | 8/1998 | Brisson | ................ | H01R 27/00 439/166 |
| 6,004,172 A * | 12/1999 | Kerek | ................ | H01R 13/10 439/879 |
| 6,077,132 A | 6/2000 | Gligorijevic | | |
| 6,102,751 A * | 8/2000 | Becker | ................ | H01R 13/42 439/784 |
| 6,176,716 B1* | 1/2001 | Mercurio | ................ | H01R 11/12 439/166 |
| 6,512,906 B2* | 1/2003 | Gack | ................ | H01T 19/00 174/74 R |
| 6,644,993 B2* | 11/2003 | Victor | ................ | H01R 27/00 439/175 |
| 6,704,987 B1* | 3/2004 | Miller | ................ | B25B 9/00 279/76 |
| 7,329,156 B2* | 2/2008 | Wells | ................ | H01R 13/639 439/738 |
| 7,854,615 B1* | 12/2010 | Kachline | ................ | B23K 9/323 439/13 |
| 8,342,891 B2* | 1/2013 | Fukushi | ................ | H01R 4/4836 439/752 |
| 8,678,867 B2* | 3/2014 | Glick | ................ | H01R 13/187 439/843 |
| 9,583,933 B1* | 2/2017 | Campbell | ................ | H01R 13/04 |
| 10,522,943 B1* | 12/2019 | Termini | ................ | H01R 13/64 |
| 10,525,842 B2* | 1/2020 | Ronfanz | ................ | H01R 13/514 |
| 10,637,166 B1* | 4/2020 | Kranz | ................ | H01R 4/183 |
| 10,717,368 B2* | 7/2020 | Wenz | ................ | B60L 53/16 |
| 2009/0023333 A1* | 1/2009 | Soubh | ................ | H01R 9/038 439/581 |
| 2009/0111335 A1* | 4/2009 | Daubigney | ................ | H01R 43/22 439/775 |
| 2010/0233903 A1* | 9/2010 | Islam | ................ | H01R 13/15 439/578 |
| 2011/0287652 A1* | 11/2011 | Roscizewski | ................ | H01R 4/26 439/345 |
| 2013/0052883 A1* | 2/2013 | Iihoshi | ................ | H01R 13/434 439/748 |
| 2013/0157506 A1* | 6/2013 | Grek | ................ | H01R 9/0521 439/578 |
| 2015/0338584 A1* | 11/2015 | Islam | ................ | G02B 6/3849 385/86 |
| 2016/0156126 A1* | 6/2016 | Eliassen | ................ | H01R 13/5219 439/272 |
| 2017/0279210 A1* | 9/2017 | Kraemer | ................ | H01R 13/111 |
| 2019/0217730 A1* | 7/2019 | Gotz | ................ | H01R 13/5202 |
| 2020/0021070 A1* | 1/2020 | Altekruse | ................ | B23K 9/32 |

\* cited by examiner

REPLACEABLE PIN FOR TERMINAL OF CHARGING INLET ASSEMBLY

CROSS-REFERENCE TO RELATED APPLICATIONS

This application claims benefit to U.S. Provisional Application No. 62/791,066, which was filed Jan. 11, 2019 and is titled Replaceable High Power Electric Vehicle Charging Contact. The subject matter of which is herein incorporated by reference in its entirety.

BACKGROUND OF THE INVENTION

The subject matter herein relates generally to charging inlet assemblies.

In order to charge a battery of an electric vehicle (EV) or hybrid electric vehicle (HEV), the vehicle is provided with a charging inlet assembly. A charging connector is configured to be mated with the charging inlet assembly. Terminals are held in a receptacle connector of a housing of the charging inlet assembly. The terminals extend through channels in the housing into a chamber at the rear of the housing for connection to corresponding power cables. The terminals may suffer from long term durability due to harsh operating and charging environments. For example, the terminals are provided at an exterior of the vehicle, and are thus exposed to the environment, such as to debris, moisture and other contaminants. Additionally, the charging connector may introduce contaminants when plugged onto the charging inlet assembly. The high currents experienced by the terminal during charging may lead to aggressive abrasion over the life of the terminal, which increases contact resistance, power loss, and excessive heating. Corrosion or other damage to the terminal typically requires replacement of the entire cable harness, which is expensive. The charging inlet assembly needs to be disassembled from the vehicle to access the cable harness for replacement, which is time consuming and requires professional service technicians.

A need remains for a charging inlet assembly that may be manufactured in a cost effective and reliable manner.

BRIEF DESCRIPTION OF THE INVENTION

In one embodiment, a terminal is provided for a charging inlet assembly including a head at a rear of the terminal. The head has a latching surface configured to be engaged by a latching feature of the charging inlet assembly to secure the terminal in a terminal channel of a housing of the charging inlet assembly. The head has a terminating end configured to be terminated to a power cable. The terminal includes a mating shaft having threads. The terminal includes a replaceable pin at a front of the terminal. The replaceable pin is removably coupled to the head. The replaceable pin has a front and a rear. The replaceable pin has an outer surface defining a separable mating interface for mating engagement with a charging conductor of a charging connector. The replaceable pin has a drive base at the rear including drive teeth configured to be engaged by a socket tool to rotate the replaceable pin relative to the head for installing or removing the replaceable pin. The mating shaft is threadably coupled to at least one of the head or the replaceable pin in a corresponding threaded bore of the head or the replaceable pin.

In another embodiment, a terminal is provided for a charging inlet assembly including a head at a rear of the terminal. The head extends between a front and a rear. The head has a latching surface configured to be engaged by a latching feature of the charging inlet assembly to secure the terminal in a terminal channel of a housing of the charging inlet assembly. The head has a terminating end at the rear configured to be terminated to a power cable. The head has a flange at the front. The terminal includes a replaceable pin removably coupled to the head. The replaceable pin has a front and a rear. The replaceable pin has an outer surface defining a separable mating interface for mating engagement with a charging conductor of a charging connector. The terminal includes a mating shaft extending between the head and the replaceable pin. The mating shaft is threadably coupled to at least one of the head and the replaceable pin. The terminal includes a spring surrounding the mating shaft positioned between the rear of the replaceable pin and the flange at the front of the head. The spring engages the replaceable pin to forward bias the replaceable pin away from the head.

In a further embodiment, a charging inlet assembly is provided including a housing extending between a front and a rear having a terminal channel between the front and the rear. The charging inlet assembly includes a terminal received in the terminal channel and coupled to the housing. The terminal extends between a mating end and a terminating end. The terminating end is configured to be terminated to a power cable at the rear of the housing. The mating end is configured to be mated to a charging connector at the front of the housing. The terminal includes a head at the terminating end. The head is received in the terminal channel and secured in the terminal channel. The terminal includes a replaceable pin at the mating end. The terminal includes a mating shaft extending between the head and the replaceable pin. The mating shaft is threadably coupled to at least one of the head and the replaceable pin such that the replaceable pin is removably coupled to the head.

DETAILED DESCRIPTION OF THE INVENTION

Figure 1:
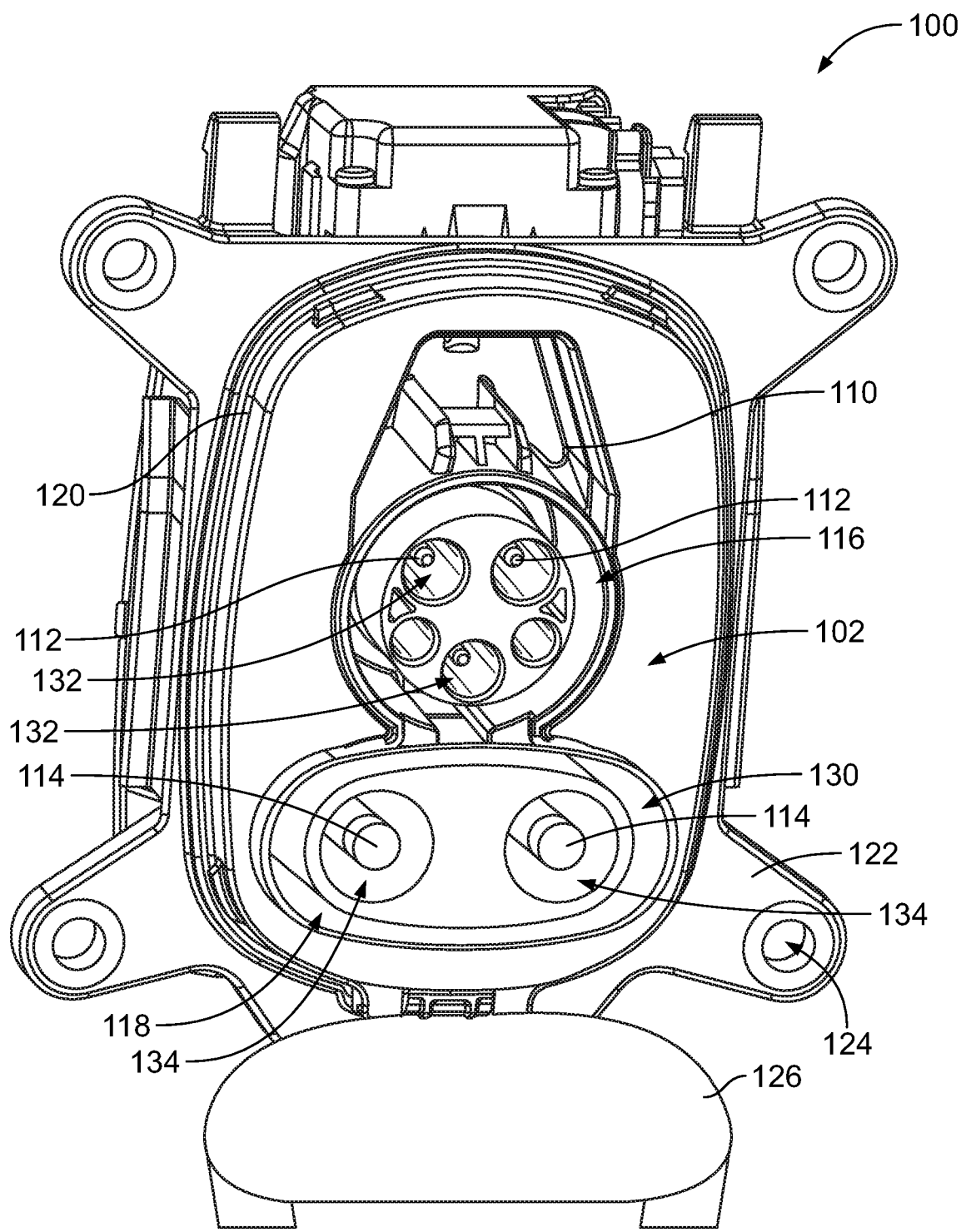
FIG. 1 is a front perspective view of a charging inlet assembly including a terminal in accordance with an exemplary embodiment.

FIG. 1 is a front perspective view of a charging inlet assembly 100 in accordance with an exemplary embodiment. The charging inlet assembly 100 is used as a charging inlet for a vehicle, such as an electric vehicle (EV) or hybrid electric vehicle (HEV). The charging inlet assembly 100 includes a receptacle connector 102 configured for mating reception with a charging connector (not shown). In an exemplary embodiment, the receptacle connector 102 is configured for mating with a DC fast charging connector, such as the SAE combo CCS charging connector, in addition to AC charging connectors, such as the SAE J1772 charging connector.

The charging inlet assembly 100 includes a housing 110 holding terminals 112 and terminals 114. The housing 110 defines the receptacle connector 102. The terminals 112, 114 form part of the receptacle connector 102 and are configured to be mated to the charging connector. In an exemplary embodiment, the terminals 112 are AC terminals and the terminals 114 are DC terminals. The terminals 112 are arranged in a first connector port 116 of the receptacle connector 102 and the terminals 114 are arranged in a second connector port 118 of the receptacle connector 102.

The charging inlet assembly 100 includes a mounting flange 120 coupled to the housing 110. The mounting flange 120 is used to couple the charging inlet assembly 100 to the vehicle. The mounting flange 120 includes mounting tabs 122 having openings 124 that receive fasteners (not shown) used to secure the charging inlet assembly 100 to the vehicle. Other types of mounting features may be used to secure the charging inlet assembly 100 to the vehicle. The mounting flange 120 may include a seal to seal the charging inlet assembly 100 to the vehicle.

The charging inlet assembly 100 includes a cover 126 hingedly coupled to the mounting flange 120 and/or the housing 110. The cover 126 is used to cover the second connector port 118. FIG. 1 illustrates the cover 126 in an open position.

In an exemplary embodiment, the housing 110 includes sockets 130 at a front of the housing 110 that receive the charging connector. The housing 110 includes upper terminal channels 132 that receive the upper terminals 112 and lower terminal channels 134 that receive the lower terminals 114. The terminal channels 132 are provided in the upper connector pot 116. The terminal channels 134 are provided in the lower connector port 118.

Figure 2:
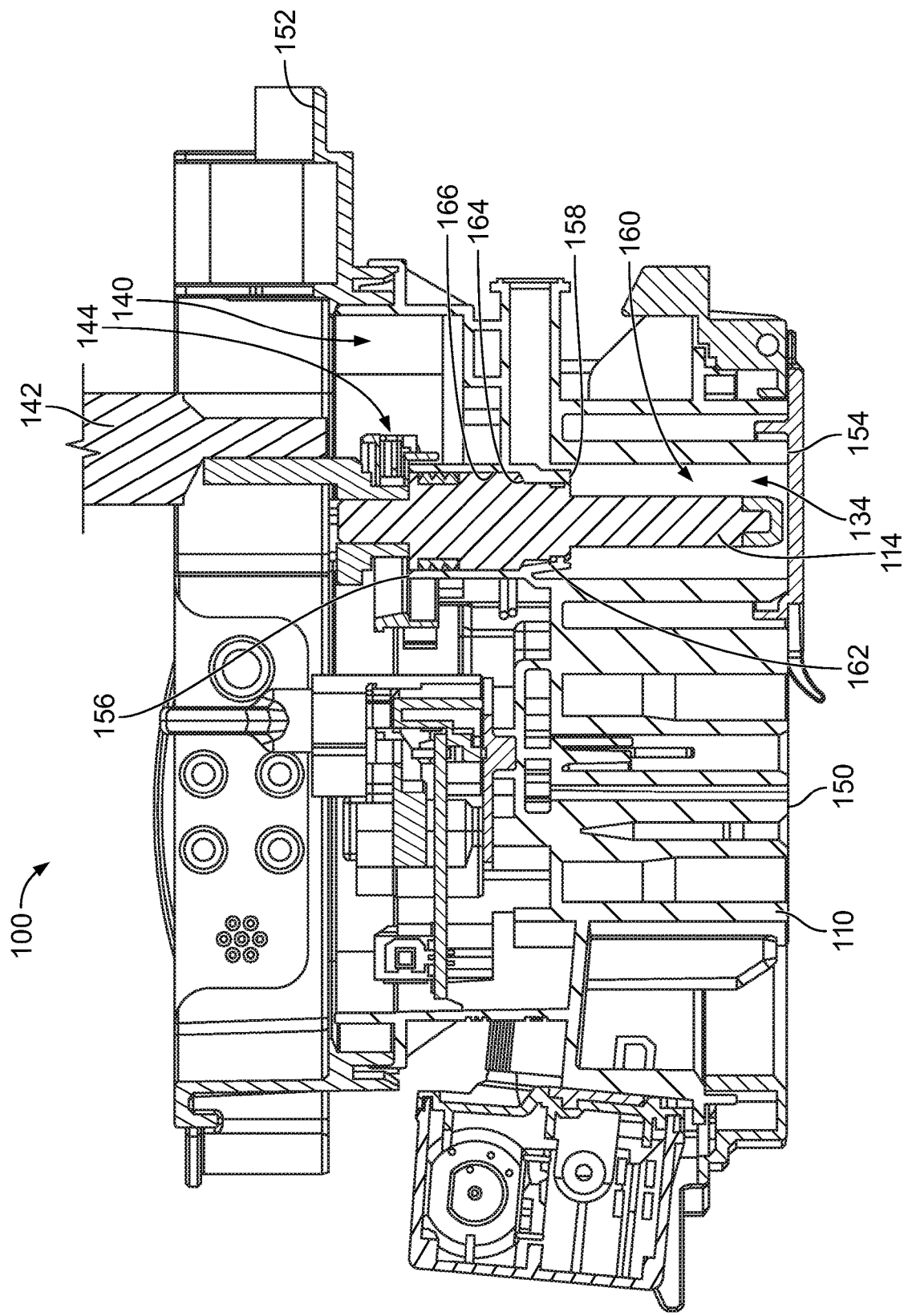
FIG. 2 is a cross sectional view of the charging inlet assembly in accordance with an exemplary embodiment.

FIG. 2 is a cross sectional view of the charging inlet assembly 100 in accordance with an exemplary embodiment. FIG. 2 illustrates the terminal 114 coupled to the housing 110. The terminal 114 is received in the terminal channel 134. In an exemplary embodiment, the terminal 114 is a multi-piece terminal and the front or mating end of the terminal 114 is removable and replaceable without removing or replacing the rear or main part of the terminal 114. As such, the separable mating interface, which is the portion of the terminal 114 matable with the charging connector, is replaceable for long term serviceability of the terminal 114, such as when the mating interface becomes worn, damaged, outdated, and the like. For example, over time, the plating or surface on the mating interface may become worn or damaged, such as from many mating cycles, from debris, moisture, or interaction with other contaminants. The mating end of the terminal 114 is removable and replaceable without needing to disassemble the housing 110 from the vehicle. The mating end of the terminal 114 is removable and replaceable from a front 150 of the housing 110 without needing to access other parts of the charging inlet assembly 100.

In an exemplary embodiment, the terminal 114 extends rearward from the terminal channel 134 into a chamber 140 at a rear 152 of the housing 110. The terminal 114 may be terminated to a power cable 142 in the chamber 140. For example, the power cable 142 may be welded to the terminal 114. The power cable 142 may be ultrasonically welded to the terminal 114 (such as to a weld pad at a rear end of the terminal 114), creating a low resistance interface between the terminal 114 and the power cable 142. In other various embodiments, the terminal 114 may be crimped to the power cable 142, or terminated to the power cable 142 by other terminating processes.

In an exemplary embodiment, a secondary lock assembly 144 is used as a safety feature as a terminal position assurance device and a locking device for the terminal 114. The secondary lock assembly 144 is movable between a locked position and an unlocked position. In the locked position, the secondary lock assembly 144 engages the terminal 114 and blocks the terminal 114 from backing out of the terminal channel 134. However, the secondary lock assembly 144 is unable to move to the locked position if the terminal 114 is not fully loaded into the terminal channel 134 (for example, only partially loaded into the terminal channel 134) because the terminal 114 would block the secondary lock assembly 144 from sliding to the locked position. Thus, the secondary lock assembly 144 provides a visual indicator to the assembler that the terminal 114 is not fully loaded if the secondary lock assembly 144 is blocked from moving to the locked position. In various embodiments, the secondary lock assembly 144 may hold the terminal 114 and resist rotation of the fixed rear end of the terminal 114 within the terminal channel 134, such as to allow installation and removal of the threaded removable/replaceable front end of the terminal 114.

The terminal channel 134 extends between a front end 154 and a rear end 156. A mid-wall 158 separates the front end 154 and the rear end 156 of the terminal channel 134. The terminal channel 134 includes a bore 160 at the front end 154 of the terminal channel 134 forward of the mid-wall 158 configured to receive a portion of the charging connector. The bore 160 is oversized relative to the terminal 114 such that a space is defined around the terminal 114 that receives a charging conductor of the charging connector.

The housing 110 includes a primary latch 162 extending into the terminal channel 134 to engage and retain the terminal 114 in the terminal channel 134. The primary latch 162 may be a deflectable latch. The primary latch 162 may be integral with the housing 110, such as co molded with the housing 110. In the illustrated embodiment, the primary latch 162 is located at the mid-wall 158. The primary latch 162 axially secures the terminal 114 in the terminal channel 134. The primary latch 162 resists rearward pull out of the terminal 114 from the terminal channel 134. Optionally, the terminal 114 may be rotatable within the terminal channel 134. In various embodiments, the primary latch 162 may hold the terminal 114 and resist rotation of the fixed rear end of the terminal 114 within the terminal channel 134, such as to allow installation and removal of the threaded removable/replaceable front end of the terminal 114.

The housing 110 includes a locating shoulder 164 extending into the terminal channel 134 to interface with and locate the terminal 114 in the terminal channel 134. The terminal 114 bottoms out against the locating shoulder 164. For example, the locating shoulder 164 may stop further forward advancement of the terminal 114 into the terminal channel 134. The locating shoulder 164 may be a step, rib, tab, or other protruding feature. The locating shoulder 164 may extend circumferentially around the terminal channel 134 or partially circumferentially around the terminal channel 134. In various embodiments, the locating shoulder 164 may hold the terminal 114 and resist rotation of the fixed rear end of the terminal 114 within the terminal channel 134, such as to allow installation and removal of the threaded removable/replaceable front end of the terminal 114. For example, the locating shoulder 164 may include a flat surface configured to engage a corresponding flat surface of the terminal 114.

The terminal channel 134 includes an interior surface 166 along the rear end 156. The interior surface 166 engages the outer surface of the terminal 114, such as by an interference fit, to tightly hold the terminal 114 in the terminal channel 134. In an exemplary embodiment, the terminal 114 may be sealed to the interior surface 166. In various embodiments, the interior surface 166 may hold the terminal 114 and resist rotation of the fixed rear end of the terminal 114 within the terminal channel 134, such as to allow installation and removal of the threaded removable/replaceable front end of the terminal 114. For example, the interior surface 166 may include a flat surface configured to engage a corresponding flat surface of the terminal 114.

Figure 3:
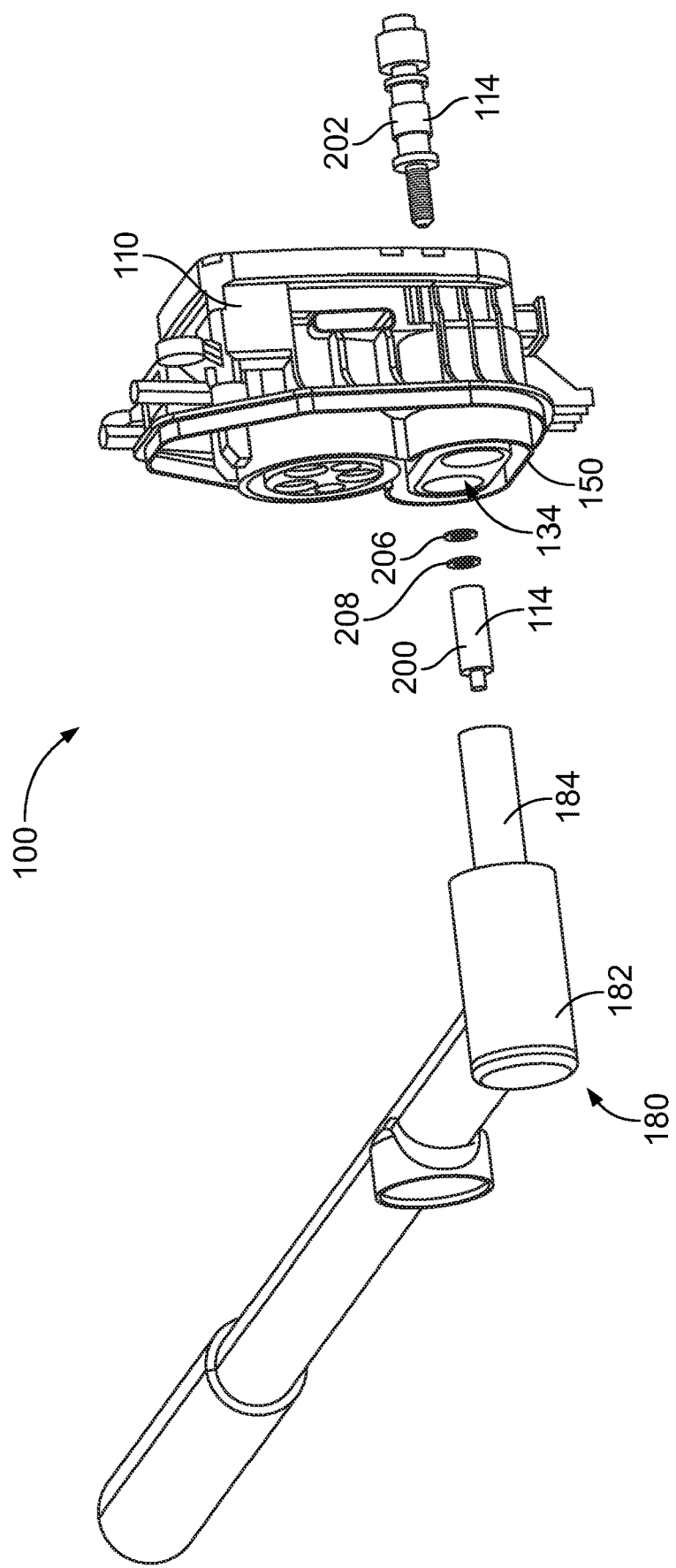
FIG. 3 is an exploded view of the charging inlet assembly showing a socket tool for removing and installing the terminal in accordance with an exemplary embodiment.

FIG. 3 is an exploded view of the charging inlet assembly 100 in accordance with an exemplary embodiment. FIG. 3 shows the terminal 114 in separate pieces positioned relative to the housing 110 of the charging inlet assembly 100. FIG. 3 shows a socket tool 180 configured to be used for installing and removing the replaceable part of the terminal 114. The socket tool 180 includes a socket wrench 182 and a socket tool body 184 coupled to the socket wrench 182. The socket wrench 182 is used to rotate the socket tool body 184 to tighten or untighten the replaceable part of the terminal 114.

The terminal 114 includes a replaceable pin 200, a head 202, and a mating shaft 204 threadably coupled to at least one of the head 202 or the replaceable pin 200. The head 202 is configured to be secured to the housing 110 in the terminal channel 134. The replaceable pin 200 is configured to be received in the terminal channel 134 and is matable to the charging connector within the terminal channel 134. The replaceable pin 200 is configured to be removably coupled to the head 202 and removable from the front 150 of the housing 110 using the socket tool 180. In an exemplary embodiment, the terminal 114 includes a spring 206 positioned between the replaceable pin 200 and the head 202. The spring 206 is used to spring bias the replaceable pin 200 in a forward direction, such as to mechanically and/or electrically and/or thermally couple the replaceable pin 200 and/or the mating shaft 204 and/or the head 202. In an exemplary embodiment, the terminal 114 includes a seal 208 positioned between the replaceable pin 200 and the head 202 and/or the mating shaft 204. The seal 208 may be an O-ring, a gasket, and the like. In alternative embodiments, the seal 208 may be grease or another type of sealant.

Figure 4:
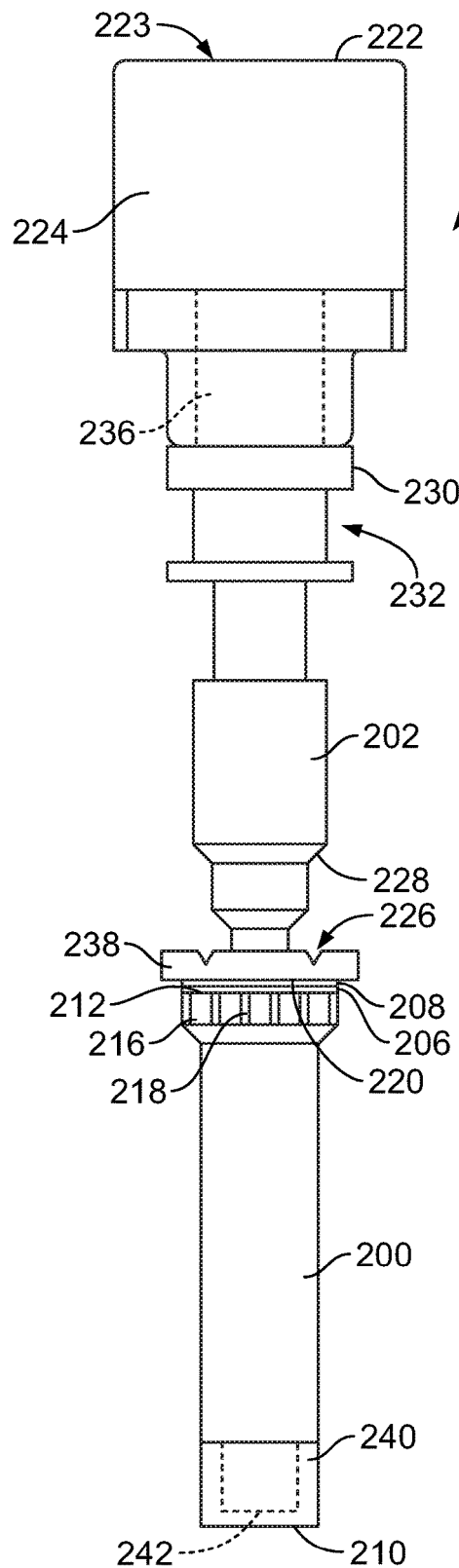
FIG. 4 is a side view of the terminal in accordance with an exemplary embodiment.
Figure 5:
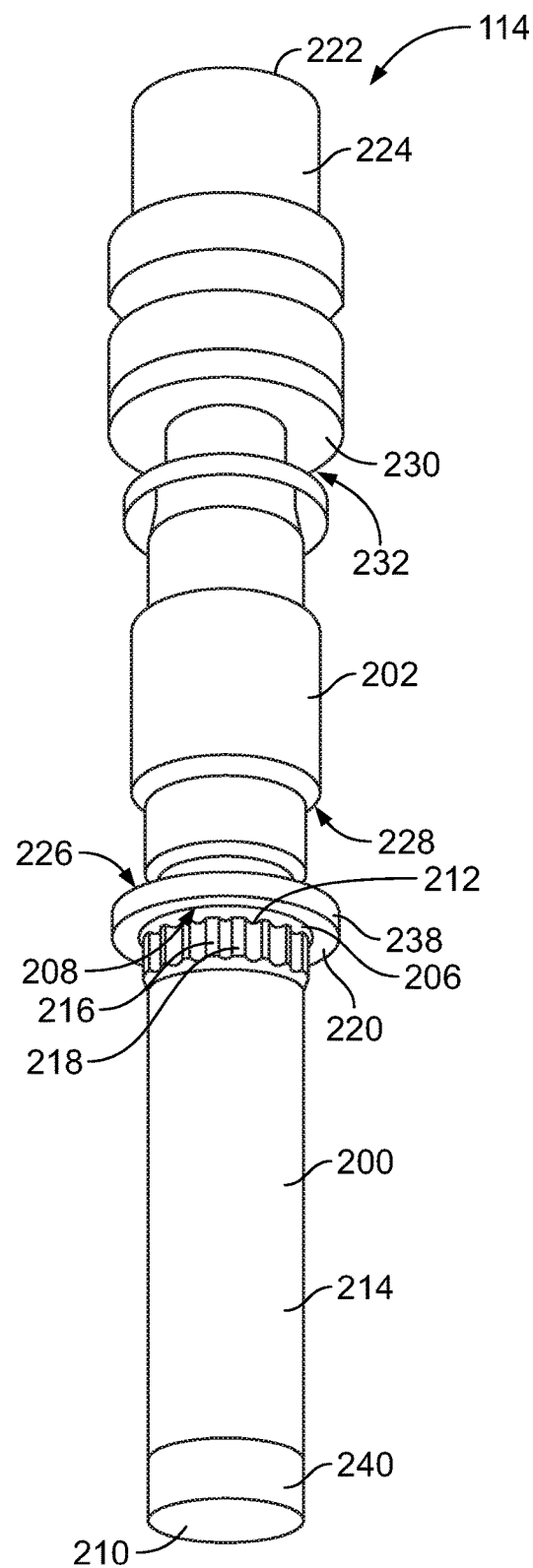
FIG. 5 is a perspective view of the terminal in accordance with an exemplary embodiment.

FIG. 4 is a side view of the terminal 114 in accordance with an exemplary embodiment. FIG. 5 is a perspective view of the terminal 114 in accordance with an exemplary embodiment. The terminal 114 includes the replaceable pin 200 and the head 202 electrically coupled to the replaceable pin 200. The replaceable pin 200 is configured to be mated to the charging connector. The head 202 is configured to be terminated to the power cable 142 (shown in FIG. 3). The replaceable pin 200 is separate and discrete from the head 202.

The replaceable pin 200 is electrically conductive. For example, the replaceable pin 200 may be manufactured from a metal material, such as a copper material. In various embodiments, replaceable pin 200 is plated, such as with a silver plating. The replaceable pin 200 extends between a front 210 and a rear 212. The replaceable pin 200 includes an outer surface 214 at the front 210 configured to be mated to the charging connector. The outer surface 214 may be defined by a plating layer. In an exemplary embodiment, the replaceable pin 200 is cylindrical.

The replaceable pin 200 includes a drive base 216 at the rear 212. The drive base 216 includes drive teeth 218 configured to be engaged by the socket tool 180 (shown in FIG. 3) to rotate the replaceable pin 200 relative to the head 202 for installing or removing the replaceable pin 200. The drive teeth 218 extend circumferentially around the perimeter of the drive base 216. The drive teeth 218 extend radially outward. Optionally, the drive base 216 and the drive teeth 218 define a drive gear configured to be rotated by the socket tool 180. In an exemplary embodiment, the drive base 216 and the drive teeth 218 have a larger diameter than a diameter of the outer surface 214 of the replaceable pin 200. Optionally, the spring 206 engages the drive base 216. Optionally, the seal 208 may engage the front flange 238.

The head 202 is located rearward of the replaceable pin 200. The head 202 extends between a front 220 and a rear 222. In an exemplary embodiment, the head 202 has a terminating end 223 at the rear 222. The terminating end 223 is configured to be terminated to the power cable 142. In the illustrated embodiment, the terminal 114 includes a weld cap 224 at the terminating end 223 coupled to the rear 222 of the head 202. Optionally, the weld cap 224 may be separate and discrete from the head 202 and define an interface for terminating to the power cable 142. For example, the power cable 142 may be welded to the weld cap 224. Alternatively, the weld cap 224 may be integral with the head 202, such as formed or machined at the rear 222. In various embodiments, the weld cap 224 may hold the terminal 114 and resist rotation of the head 202, such as within the terminal channel 134, to allow installation and removal of the replaceable pin 200. For example, the weld cap 224 registers or fixes the head 202 to stop the head 202 from rotating while the replaceable pin 200 is threadably coupled to the head 202.

In an exemplary embodiment, the head 202 includes a latching groove 226 formed circumferentially around the head 202, such as near the front 220 of the head 202. In an exemplary embodiment, the head 202 includes a locating shoulder 228 formed circumferentially around the head 202. The locating shoulder 228 is used for locating the replaceable pin 200 in the terminal channel 134. In various embodiments, the locating shoulder 228 may include features, such as one or more flat surfaces, tips, posts or other features that engage the housing 110 to stop the head 202 from rotating while the replaceable pin 200 is threadably coupled to the head 202.

The head 202 includes a rear flange 230 at the rear 222. The rear flange 230 includes a groove 232 that receives the secondary lock assembly 144 (shown in FIG. 2). The head 202 includes a rear mounting post 236 (shown in phantom) extending rearward from the rear flange 230. The weld cap 224 may be press-fit on the rear mounting post 236. The rear mounting post 236 may be cylindrical, such as to allow the weld cap 224 to be rotatably positionable on the head 202. The head 202 includes a front flange 238 at the front 220. The replaceable pin 200 extends forward of the front flange 238. Optionally, the spring 206 engages the front flange 238. Optionally, the seal 208 may engage the front flange 238.

In an exemplary embodiment, the replaceable pin 200 includes a cap 240 at a tip 242 of the replaceable pin 200. The cap 240 is manufactured from a dielectric material, such as a plastic material. The cap 240 makes the terminal 114 touch-safe at the front of the housing 110.

Figure 6:
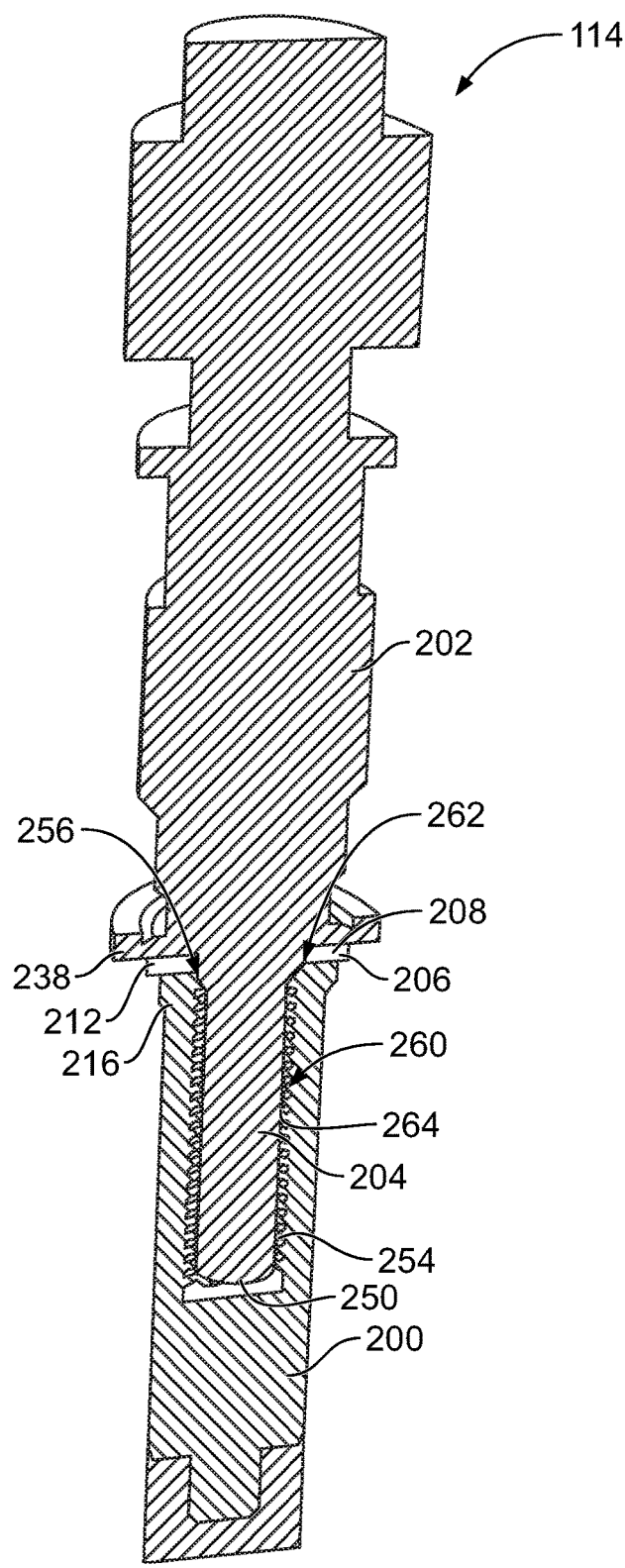
FIG. 6 is a cross-sectional view of the terminal in accordance with an exemplary embodiment.

FIG. 6 is a cross-sectional view of the terminal 114 in accordance with an exemplary embodiment. FIG. 6 shows the mating shaft 204 extending from the head 202. In an exemplary embodiment, the mating shaft 204 is integral with the head 202. For example, the mating shaft 204 and the head 202 are a unitary, monolithic structure. The mating shaft 204 is separate and discrete from the replaceable pin 200.

The mating shaft 204 extends forward of the front flange 238. The mating shaft 204 extends to a front end 250. The mating shaft 204 has external threads 254 along the mating shaft 204. In an exemplary embodiment, the threads 254 extend a majority of a length of the mating shaft 204. Optionally, the threads 254 may extend substantially the entire length of the mating shaft 204.

In an exemplary embodiment, the spring 206 extends over the mating shaft 204 and is seated against the front flange 238. The spring 206 may be a wave spring. The spring 206 may be a disc spring. The spring 206 includes an opening 256 that receives the mating shaft 204. The spring 206 is compressed between the head 202 and the replaceable pin 200. The spring 206 forward biases the replaceable pin 200, such as against the threads 254 of the mating shaft 204. In an exemplary embodiment, the seal 208 extends over the mating shaft 204. The seal 208 may be sealed against the front flange 238 and/or the drive base 216 and/or the mating shaft 204.

In an exemplary embodiment, the replaceable pin 200 includes a bore 260 at the rear 212. The bore 260 has an opening 262 at the rear 212 that receives the mating shaft 204. The bore 260 includes internal threads 264 that interface with the external threads 254 of the mating shaft 204. The replaceable pin 200 is threadably coupled to the mating shaft 204. The replaceable pin 200 is rotated to install the replaceable pin 200 onto or remove the replaceable pin 200 from the mating shaft 204, such as using the socket tool 180 (shown in FIG. 3). The spring 206 forward biases the replaceable pin 200 to press the threads 264 of the replaceable pin 200 against the threads 254 of the mating shaft 204 to maintain mechanical, electrical and thermal coupling between the replaceable pin 200 and the mating shaft 204. The spring 206 maintains the positive force between the threads 254, 264 during thermal expansion and contraction of the replaceable pin 200 and the mating shaft 204.

Figure 7:
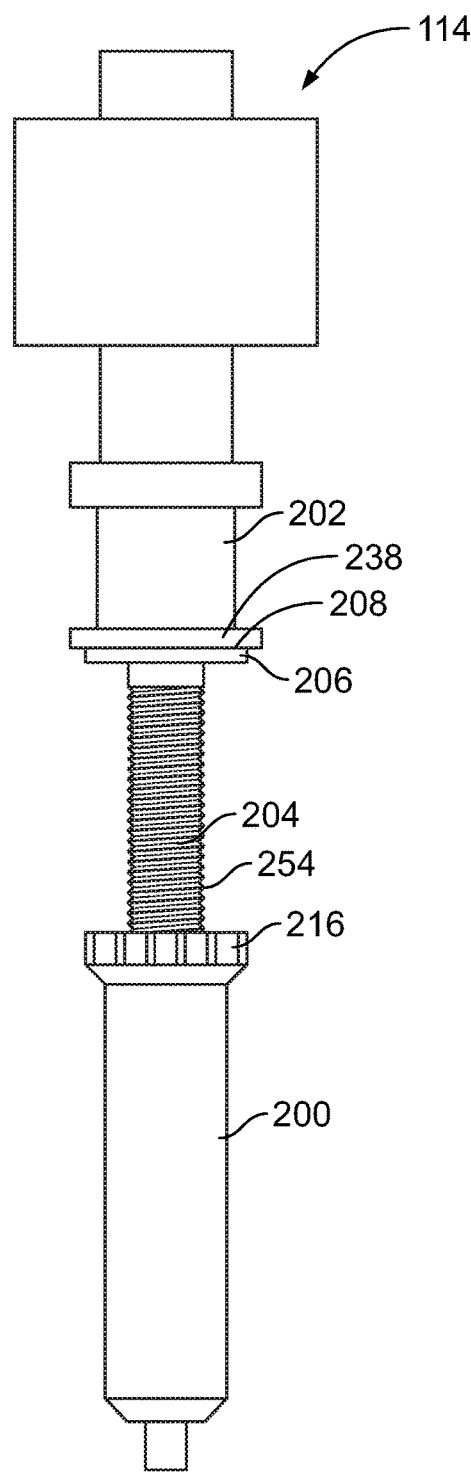
FIG. 7 is a perspective view of the terminal in a partially assembled state.

FIG. 7 is a perspective view of the terminal 114 in a partially assembled state. FIG. 7 shows the replaceable pin 200 partially threaded onto the threads 254 of mating shaft 204. The seal 208 and the spring 206 are positioned between the front flange 238 of the head 202 and the drive base 216 of the replaceable pin 200.

Figure 8:
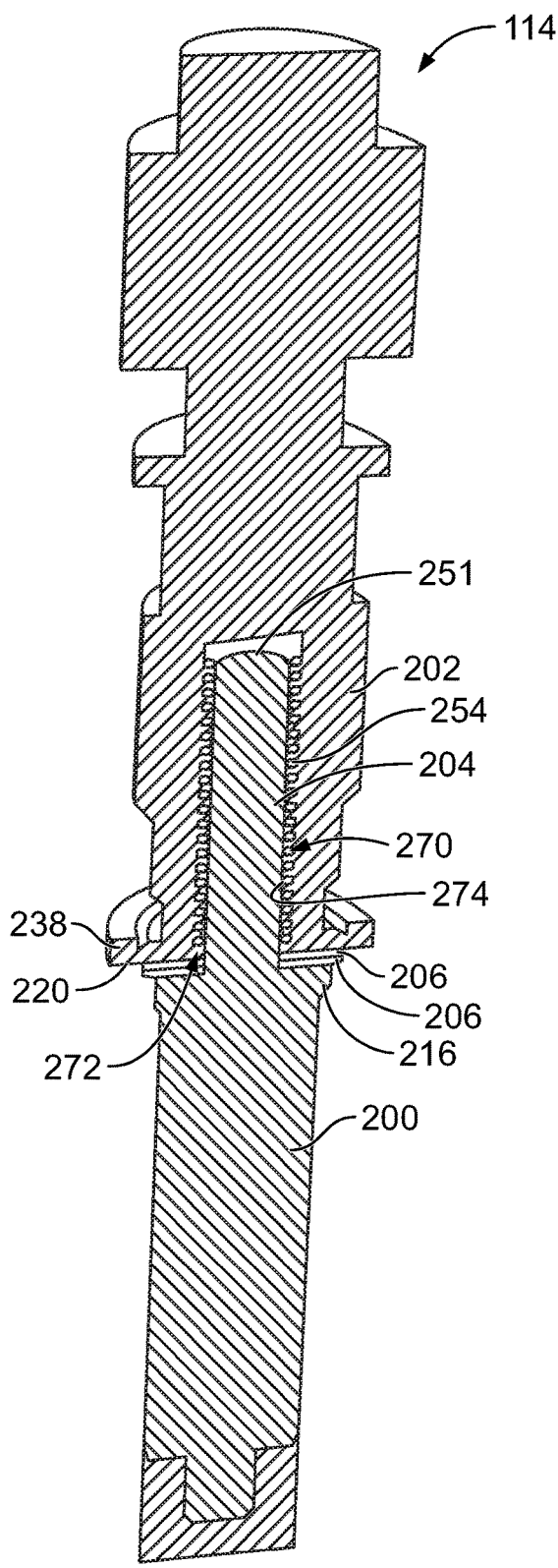
FIG. 8 is a cross-sectional view of the terminal in accordance with an exemplary embodiment.

FIG. 8 is a cross-sectional view of the terminal 114 in accordance with an exemplary embodiment. FIG. 8 shows the mating shaft 204 extending from the replaceable pin 200 rather than the head 202. In an exemplary embodiment, the mating shaft 204 is integral with the replaceable pin 200. For example, the mating shaft 204 and the replaceable pin 200 are a unitary, monolithic structure. The mating shaft 204 is separate and discrete from the head 202.

The mating shaft 204 extends rearward of the drive base 216. The mating shaft 204 extends to a rear end 251. The mating shaft 204 has the exterior threads 254 along the mating shaft 204. In the illustrated embodiment, multiple springs 206 extend over the mating shaft 204 in a stacked arrangement between the front flange 238 of the head 202 and the drive base 216 of the replaceable pin 200. In the illustrated embodiment, the springs 206 are arranged front-to-back and nested with each other. Providing multiple springs 206 increases the spring forces acting between the replaceable pin 200 and the head 202.

In an exemplary embodiment, the head 202 includes a bore 270 at the front 220. The bore 270 has an opening 272 at the front 220 that receives the mating shaft 204. The bore 270 includes internal threads 274 that interface with the external threads 254 of the mating shaft 204. The head 202 is threadably coupled to the mating shaft 204. The replaceable pin 200 and the mating shaft 204 are rotated to install the replaceable pin 200 onto the head 202 or remove the replaceable pin 200 from the head 202, such as using the socket tool 180 (shown in FIG. 3). The spring 206 forward biases the replaceable pin 200 to press the threads 254 of the mating shaft 254 against the threads 274 of the head 202 to maintain mechanical, electrical and thermal coupling between the mating shaft 204 and the head 202. The spring 206 maintains the positive force between the threads 254, 274 during thermal expansion and contraction of the mating shaft 204 and the head 202.

Figure 9:
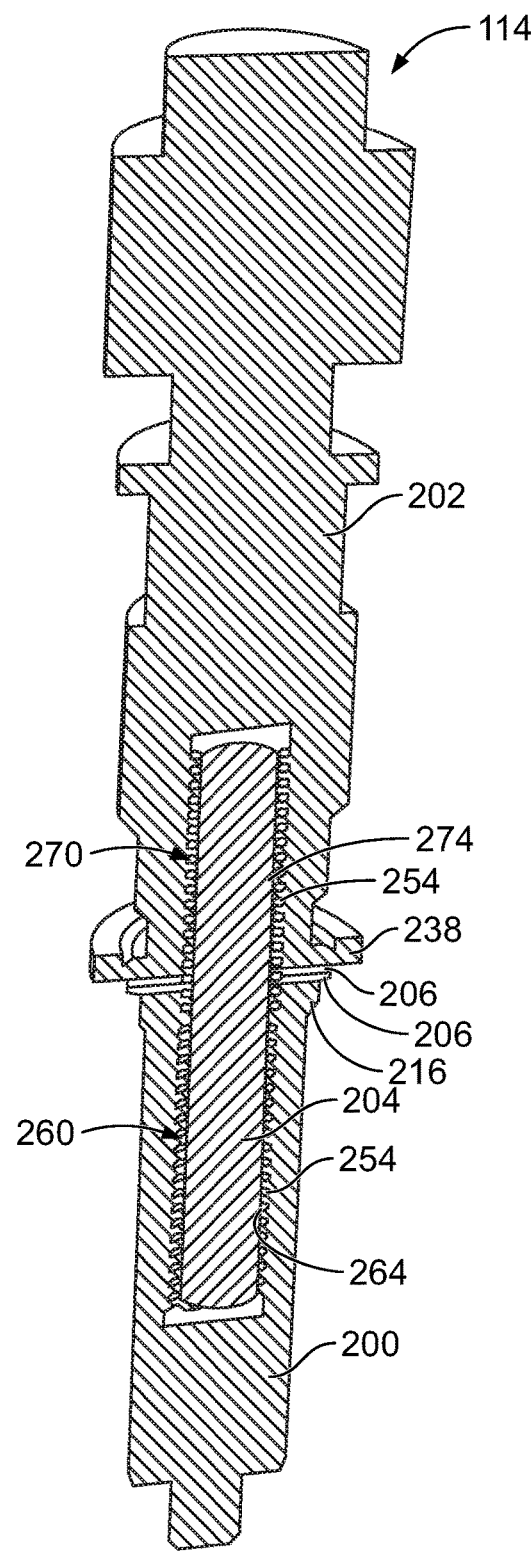
FIG. 9 is a cross-sectional view of the terminal in accordance with an exemplary embodiment.

FIG. 9 is a cross-sectional view of the terminal 114 in accordance with an exemplary embodiment. FIG. 9 shows the mating shaft 204 extending between the replaceable pin 200 and the head 202. In an exemplary embodiment, the mating shaft 204 is separate and discrete from the replaceable pin 200 and is separate and discrete from the head 202. For example, the mating shaft 204 is a threaded rod being threaded along substantially an entire length of the mating shaft 204, such as at both ends of the mating shaft 204. The top of the mating shaft 204 is received in the bore 270 of the head 202 and threadably coupled to the head 202 and the bottom of the mating shaft 204 is received in the bore 260 of the replaceable pin 200 and threadably coupled to the replaceable pin 200. The threads 254 of the mating shaft 204 threadably engage the threads 264 of the replaceable pin 200 and threadably engage the threads 274 of the head 202.

In the illustrated embodiment, multiple springs 206 extend over the mating shaft 204 in a stacked arrangement between the front flange 238 of the head 202 and the drive base 216 of the replaceable pin 200. In the illustrated embodiment, the springs 206 are arranged back-to-back such that the springs face in opposite directions, thus increasing the spring gap between the front flange 238 and the drive base 216 compared to the front-to-back arrangement (FIG. 8).

Figure 10:
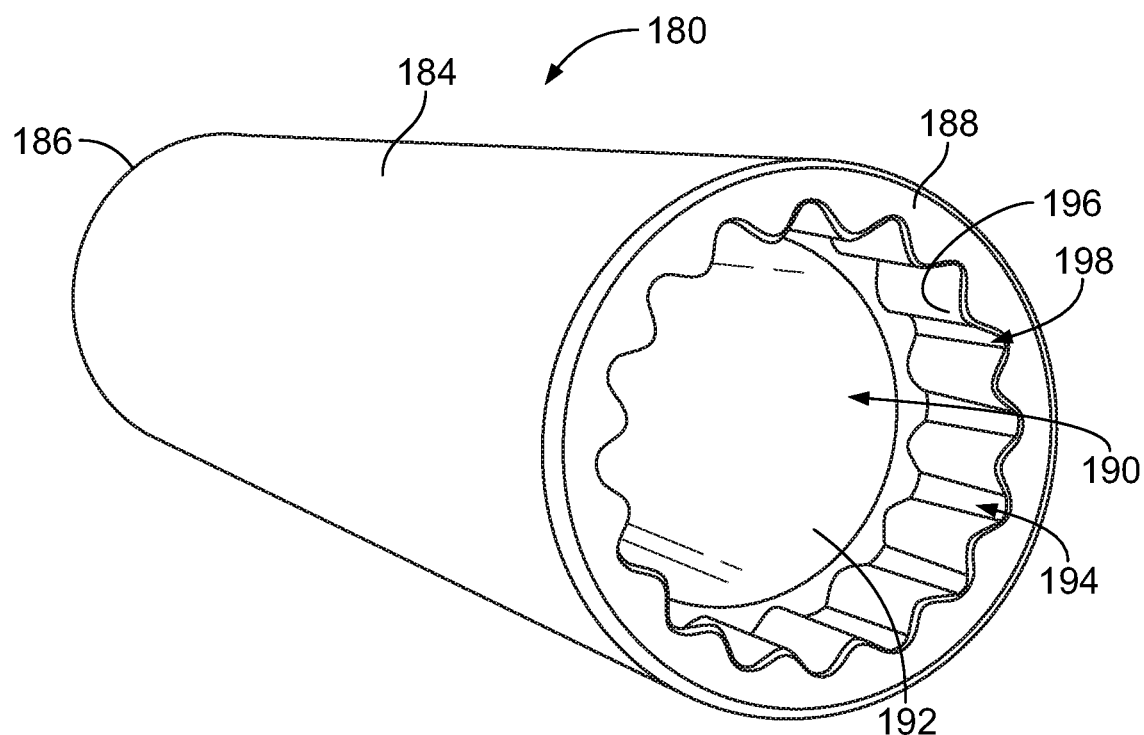
FIG. 10 is a rear perspective view of a portion of the socket tool in accordance with an exemplary embodiment.
Figure 11:
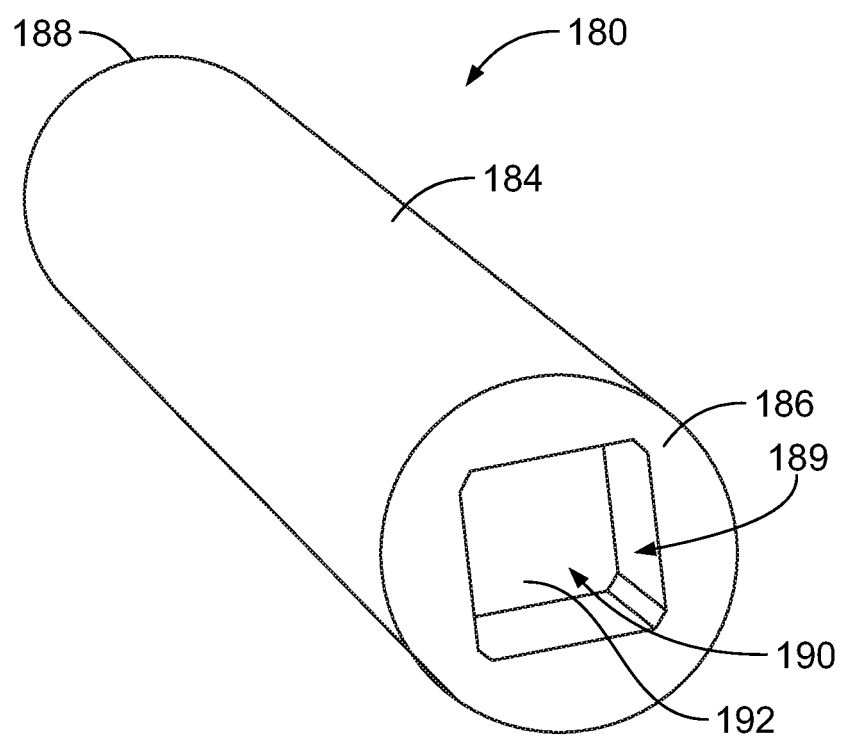
FIG. 11 is a front perspective view of a portion of the socket tool in accordance with an exemplary embodiment.

FIG. 10 is a rear perspective view of a portion of the socket tool 180 in accordance with an exemplary embodiment. FIG. 11 is a front perspective view of a portion of the socket tool 180 in accordance with an exemplary embodiment. FIGS. 10 and 11 illustrate the socket tool body 184 used to tighten or loosen the replaceable pin 200 of the terminal (shown in FIG. 3).

The socket tool body 184 extends between a front 186 and a rear 188. The socket tool body 184 includes a drive opening 189 (FIG. 11), such as a square drive opening, at the front 186. The drive opening 189 may be a ¼" square drive opening in various embodiments. The drive opening 189 receives the socket wrench 182 (shown in FIG. 2).

The socket tool body 184 includes a bore 190 extending between the front 186 and the rear 188. The bore 190 receives the replaceable pin 200. In an exemplary embodiment, the bore 190 has a thermoplastic lining 192 to protect the outer surface 214 of the replaceable pin 200 from marring or damage during insertion, removal, rotation or other manipulation. The thermoplastic lining 192 may be a polypropylene lining. In an exemplary embodiment, the bore 190 has a bore diameter approximately equal to a diameter of the outer surface 214 to closely hold the replaceable pin 200 in the bore 190, such as to limit rocking or movement between the socket tool body 184 and the replaceable pin 200 during tightening and untightening.

The socket tool body 184 includes a pin opening 194 (FIG. 10) at the rear 188. The pin opening 194 receives the drive base 216 of the replaceable pin 200 and is used to drive and rotate the replaceable pin 200. The pin opening 194 includes drive walls 196 separated by pockets 198. The pockets 198 receive the drive teeth 218 of the drive base 216 of the replaceable pin 200. The pockets 198 are sized and shaped to receive the drive teeth 218. The pockets 198 define points of the socket tool body 184. In the illustrated embodiment, the socket tool body 184 is a sixteen (16) point socket tool body having sixteen (16) pockets 198 and sixteen (16) drive walls 196; however, the socket tool body 184 may have greater or fewer points in alternative embodiments. Optionally, ends of the pockets 198 may be flat. However, ends of the pockets 198 may be curved or angled in alternative embodiments. The drive walls 196 extend between the pockets 198. In various embodiments, the drive walls 196 are curved, such as U-shaped. However, the drive walls 196 may be angled walls, such as V-shaped walls, or may have other shapes, such as including flat sections. In an exemplary embodiment, the socket tool body 184 has a pin opening diameter in the pin opening 194 that is larger than the bore diameter. For example, the drive walls 196 and the pockets 198 are stepped outward compared to the bore 190.

Figure 12:
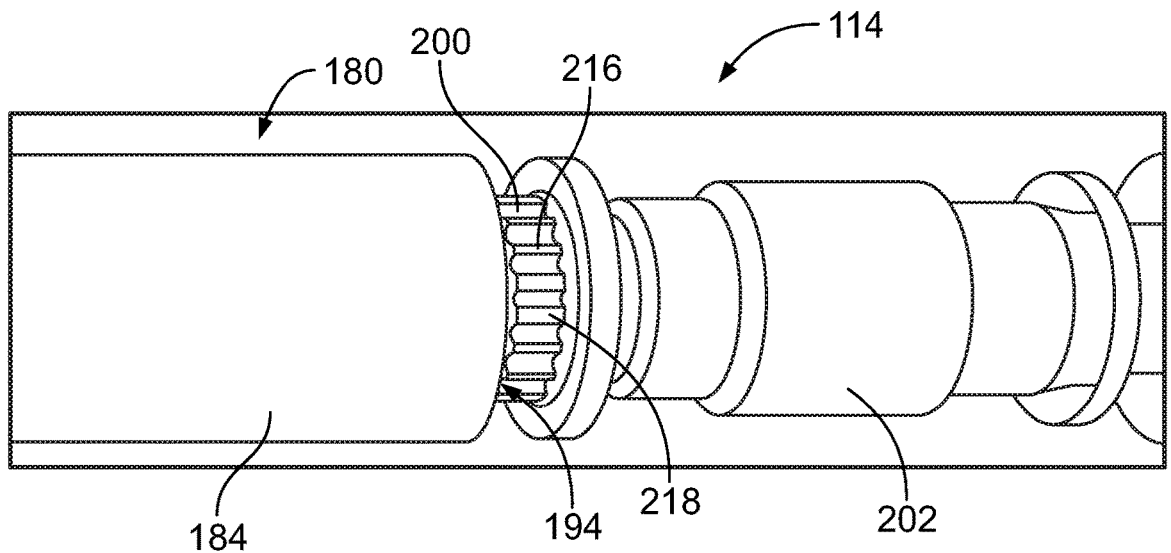
FIG. 12 illustrates the socket tool partially mated with the terminal in accordance with an exemplary embodiment.

FIG. 12 illustrates the socket tool 180 partially mated with the terminal 114 showing the socket tool body 184 positioned relative to the drive base 216 of the replaceable pin 200. The socket tool body 184 is configured to be coupled to the drive base 216 to engage and rotate the replaceable pin 200 to install and remove the replaceable pin 200 relative to the head 202. The pin opening 194 of the socket tool body 184 receives the drive base 216 and engages the drive teeth 218 to rotate the replaceable pin 200.

Figure 13:
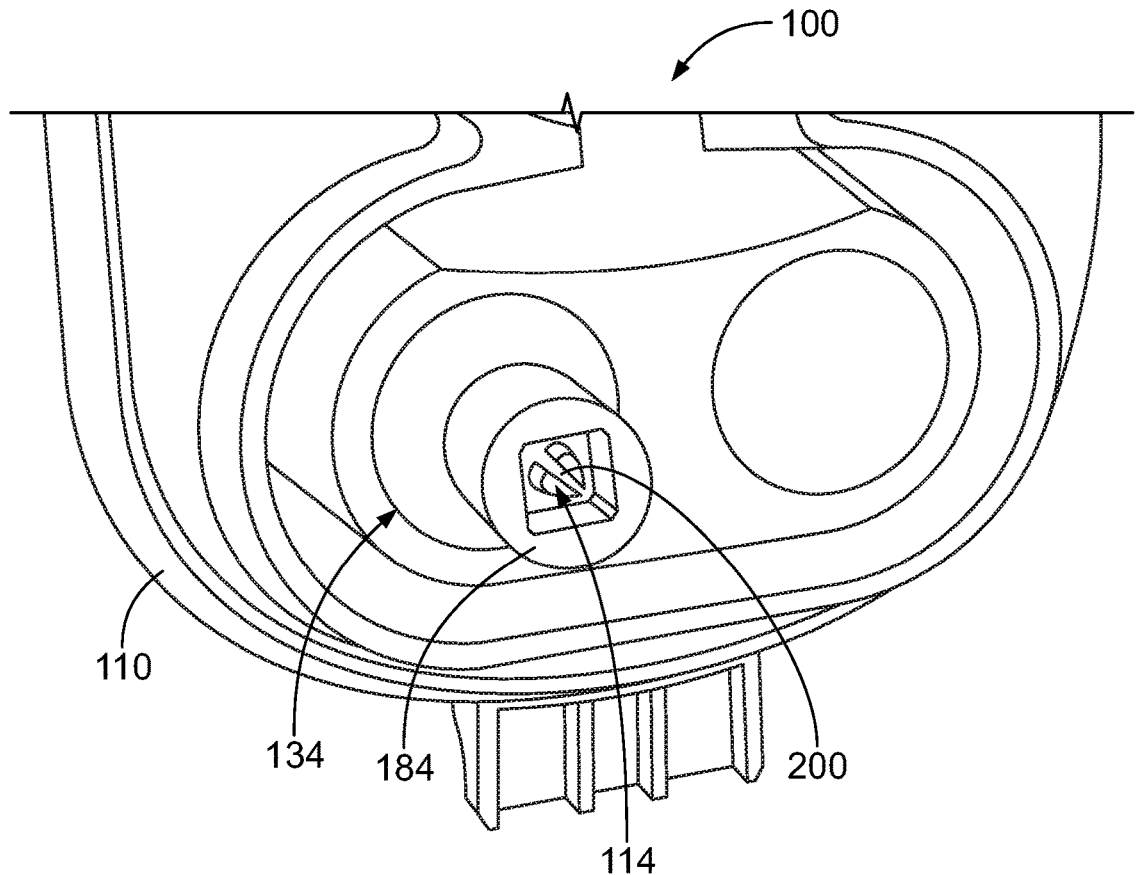
FIG. 13 is a front perspective view of a portion of the charging inlet assembly showing a portion of the socket tool in accordance with an exemplary embodiment.

FIG. 13 is a front perspective view of a portion of the charging inlet assembly 100 showing the socket tool body 184 loaded into the housing 110 on the corresponding terminal 114 for removal of the terminal 114. The socket tool body 184 is loaded into the terminal channel 134 to engage the replaceable pin 200 and remove the replaceable pin 200 without removing the entire terminal 114 from the housing 110 and without removing the housing 110 from the vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A terminal for a charging inlet assembly comprising:
a head at a rear of the terminal, the head having a latching surface configured to be engaged by a latching feature of the charging inlet assembly to secure the terminal in a terminal channel of a housing of the charging inlet assembly, the head having a terminating end configured to be terminated to a power cable;
a mating shaft having threads; and
a replaceable pin at a front of the terminal, the replaceable pin being removably coupled to the head, the replaceable pin having a front and a rear, the replaceable pin having a closed tip and an outer surface rearward of the tip defining a separable mating interface for mating engagement with a charging conductor of a charging connector, the replaceable pin having a drive base at the rear including drive teeth configured to be engaged by a socket tool from the front of the replaceable pin to rotate the replaceable pin relative to the head for installing or removing the replaceable pin;
wherein the mating shaft is threadably coupled to at least one of the head or the replaceable pin in a corresponding threaded bore of the head or the replaceable pin.

2. The terminal of claim 1, wherein the replaceable pin is rotatable relative to the head to install and remove the replaceable pin.

3. The terminal of claim 1, wherein the replaceable pin has a pin diameter along the outer surface, the drive base having a base diameter larger than the pin diameter.

4. The terminal of claim 1, further comprising a spring positioned between the rear of the replaceable pin and the head, the replaceable pin being forward biased by the spring.

5. The terminal of claim 4, wherein the spring is a wave spring surrounding the mating shaft.

6. The terminal of claim 1, further comprising a seal between the replaceable pin and at least one of the mating shaft and the head.

7. The terminal of claim 6, wherein the seal is an O-ring.

8. The terminal of claim 1, wherein the mating shaft is integral with the head and extends forward of the head, the mating shaft being received in a bore of the replaceable pin and being threadably coupled to internal threads of the replaceable pin in the bore.

9. The terminal of claim 1, wherein the mating shaft is integral with the replaceable pin and extending rearward of the rear of the replaceable pin, the mating shaft being received in a bore of the head and being threadably coupled to internal threads of the head in the bore.

10. The terminal of claim 1, wherein the mating shaft is separate and discrete from the head and is separate and discrete from the replaceable pin, the head having a bore at a front of the head having internal threads being threadably coupled to the mating shaft, the replaceable pin having a bore at the rear of the replaceable pin having internal threads being threadably coupled to the mating shaft.

11. A terminal for a charging inlet assembly comprising:
a head at a rear of the terminal, the head extending between a front and a rear, the head having a latching surface configured to be engaged by a latching feature of the charging inlet assembly to secure the terminal in a terminal channel of a housing of the charging inlet assembly, the head having a terminating end at the rear configured to be terminated to a power cable, the head having a flange at the front;
a replaceable pin removably coupled to the head, the replaceable pin having a front and a rear, the replaceable pin having a closed tip at the front and an outer surface rearward of the tip defining a separable mating interface for mating engagement with a charging conductor of a charging connector;
a mating shaft extending between the head and the replaceable pin, the mating shaft being threadably coupled to at least one of the head and the replaceable pin; and
a spring surrounding the mating shaft, the spring positioned between the rear of the replaceable pin and the flange at the front of the head, the spring engaging the replaceable pin to forward bias the replaceable pin away from the head.

12. The terminal of claim 11, wherein the replaceable pin is rotatable relative to the head to install and remove the replaceable pin.

13. The terminal of claim 11, wherein the replaceable pin has a drive base at the rear including drive teeth configured to be engaged by a socket tool to rotate the replaceable pin relative to the head for installing or removing the replaceable pin.

14. The terminal of claim 11, wherein the mating shaft is integral with the head and extends forward of the head, the mating shaft being received in a bore of the replaceable pin and being threadably coupled to internal threads of the replaceable pin in the bore.

15. A charging inlet assembly comprising:
a housing extending between a front and a rear, the housing having a terminal channel between the front and the rear, the housing having a latching feature in the terminal channel; and
a terminal received in the terminal channel and coupled to the housing, the terminal extending between a mating end and a terminating end, the terminating end configured to be terminated to a power cable at the rear of the housing, the mating end configured to be mated to a charging connector at the front of the housing, the terminal comprising:
a head at a rear of the terminal, the head having a latching surface configured to be engaged by the latching feature to secure the terminal in the terminal channel of the housing, the head including the terminating end configured to be terminated to the power cable;
a mating shaft having threads; and
a replaceable pin at a front of the terminal, the replaceable pin being removably coupled to the head, the replaceable pin having a front and a rear, the replaceable pin having a closed tip and an outer surface rearward of the tip defining a separable mating interface for mating engagement with a charging conductor of the charging connector, the replaceable pin having a drive base at the rear including drive teeth configured to be engaged by a socket tool from the front of the replaceable pin to rotate the replaceable pin relative to the head for installing or removing the replaceable pin;
wherein the mating shaft is threadably coupled to at least one of the head or the replaceable pin in a corresponding threaded bore of the head or the replaceable pin.

16. The charging inlet assembly of claim 15, wherein the replaceable pin is removable from the terminal channel without removing the head from the terminal channel.

17. The charging inlet assembly of claim 15, further comprising a socket tool having a body extending between a front and a rear, the body having a bore extending between the front and the rear, the body having a pin opening at the rear including a plurality of drive walls separated by pockets, the pocket receiving corresponding drive teeth of the drive base, the drive walls engaging the drive base to rotate the replaceable pin for installing or removing the replaceable pin.

18. The charging inlet assembly of claim 17, wherein the bore of the socket tool has a thermoplastic lining, the thermoplastic lining engaging an outer surface of the replaceable pin.

19. The charging inlet assembly of claim 15, wherein the bore of the socket tool has a bore diameter and the pin opening of the socket tool has a pin opening diameter, the pin opening diameter being larger than the bore diameter.

20. The charging inlet assembly of claim 15, further comprising a spring positioned between the rear of the replaceable pin and the head, the replaceable pin being forward biased by the spring.

* * * * *